United States Patent [19]

Yamada

[11] Patent Number: 4,901,302
[45] Date of Patent: Feb. 13, 1990

[54] APPARATUS FOR REPRODUCING INFORMATION RECORDED ON A COMPACT DISC ONTO A RECORDING MEDIUM HAVING TWO RUNNING DIRECTIONS

[75] Inventor: Jiro Yamada, Neyagawa, Japan

[73] Assignee: Matsushita Electric Industrial Co., Ltd., Kadoma, Japan

[21] Appl. No.: 76,429

[22] Filed: Jul. 21, 1987

[30] Foreign Application Priority Data

Jul. 25, 1986 [JP] Japan .................................. 61-175913

[51] Int. Cl.⁴ .............................................. G11B 7/28
[52] U.S. Cl. ...................................................... 369/85
[58] Field of Search ........................... 369/84, 85, 14; 360/74.1, 13, 15, 74.4, 74.2, 74.3

[56] References Cited

U.S. PATENT DOCUMENTS 4,543,618  9/1985  Sato ......................................... 360/15
4,665,443  5/1987  Tanaka ................................ 360/74.1

FOREIGN PATENT DOCUMENTS 6313484   7/1986  Japan .
61-284870 12/1986  Japan ...................................... 369/85
61-287034 12/1986  Japan .

Primary Examiner—Vincent P. Canney
Assistant Examiner—James Tomassini
Attorney, Agent, or Firm—Cushman, Darby & Cushman

[57] ABSTRACT

In order to record information from a compact disc apparatus to an automatic reversing cassette tape recorder without any loss of the information, the compact disc player (22) and the cassette tape recorder (13) are synchronously started by a reproducing start control means (21). When the cassette tape comes to one end, a tape end detection means (10) issues a pulse, making the compact disc player pause for a 1-2 sec. time period. This period is longer than the time period required for reversing the cassette tape recorder so the compact disc player (22) does not reproduce the information direction change, by the cassette tape recorder (13), while the tape continues. This prevents loss of information reproduced by the compact disc player (22) during the tape reversing.

2 Claims, 4 Drawing Sheets

APPARATUS FOR REPRODUCING INFORMATION RECORDED ON A COMPACT DISC ONTO A RECORDING MEDIUM HAVING TWO RUNNING DIRECTIONS

FIELD OF THE INVENTION AND RELATED ART STATEMENT

1. Field of the Invention

The present invention relates to an information reproducing and recording apparatus, and more particularly to an apparatus which can record information from an information reproducing apparatus to an information recording apparatus without any omission of the information while reversing the driving direction of the recording medium in the recording apparatus.

2. Description of the Related Art

The information reproducing and recording apparatus of the prior art has been configured as shown in FIG. 5. An information reproducing apparatus A, such as a compact disc player, is shown including a disc reproducing apparatus 2 and a reproducing start control means 1 for controlling the starting of the disc reproducing apparatus 2. Also, an information recording apparatus B is shown including a recording apparatus 4 and a recording start control means 3 for controlling the starting of the recording apparatus 4. In the prior art, the information reproducing apparatus A and the information recording apparatus B are connected such that an output signal of the disc reproducing apparatus 2 is given to the recording apparatus 4, and a control signal from the reproducing start control means 1 is given to the recording start control means 3.

The operation of the above-mentioned conventional example is as follows. First, the user handles the reproducing start control means 1 to make the information reproducing apparatus 2 start a reproducing of the disc reproducing apparatus 2, and at the same time the signal from the reproducing start control means 1 is given to the recording start control means 3, thereby to start the recording apparatus 4 such as a cassette tape recorder. Then, the information signal reproduced by the disc recording apparatus 2 of the information reproducing apparatus A is given to the recording apparatus 4 of the information recording apparatus B, and the information is recorded on the cassette tape.

The above-mentioned conventional combination of the information reproducing apparatus A and the information recording apparatus B have the following problem. When one side or one track of the cassette tape of the recording apparatus 4 comes to an end during the process of the reproducing and recording, the recording operation is discontinued by apparatus B while the reproducing operation of apparatus A continues. Thus, the information reproduction by the disc reproducing apparatus 2 is made continuously even after the recording function of the recording apparatus 4 stops. To remedy this problem, another embodiment of the prior art includes a recording apparatus 4 with an automatic cassette tape reversing feature wherein upon coming to the end of the cassette tape, the running direction of the cassette tape and connection of the recording heads are automatically reversed. This embodiment continues the recording operation by reversing the running direction of the tape when the cassette tape comes to one end. However, in the prior art recorder, the recording apparatus 4 requires a predetermined time period, for instance, 1 to 2 seconds, to start the reverse direction recording during which, no recording can occur. During such time period, the information reproduced by the disc reproducing apparatus 2 continues even though the recording function is temporarily inoperative. Accordingly, the recorded information on the cassette tape does not contain the full information reproduced by the information reproducing apparatus A.

OBJECT AND SUMMARY OF THE INVENTION

The object of the present invention is to provide an improved information reproducing and recording apparatus, wherein information reproduced by an information reproducing apparatus can be fully recorded without loss of information for the time period required to reverse the running direction of the recording medium.

In order to achieve the above-mentioned object, the information reproducing and recording apparatus in accordance with the present invention comprises;

a disc reproducing apparatus for reproducing information recorded on a disc, a recording apparatus for recording the information reproduced from the disc on a recording medium having at least two running directions (cassette tape), recording start control means for controlling the start of the disc reproducing apparatus synchronously with the start of the recording apparatus, end detection means for detecting the end of the recording medium, reversing the running means for reversing direction of the recording medium in the recording apparatus, pause control means for pausing the reproducing of information from the disc reproducing apparatus when the end detection means detects the end of the recording medium unitl the reversing means reverses the recording direction of the recording medium.

According to the above-mentioned configuration of the apparatus, when one side of the recording medium or one track of the recording medium comes to the end during the pendency of the reproducing of the information in the information reproducing apparatus, the disc player or the like information reproducing apparatus is stopped for a predetermined time to wait for the restarting of the recording apparatus on another side or another track of the recording medium. This invention eliminates the omission of loss of reproduced information inherent in the prior art, thereby enabling complete recording of the information from the compact disc to the recording medium.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Figure 1:
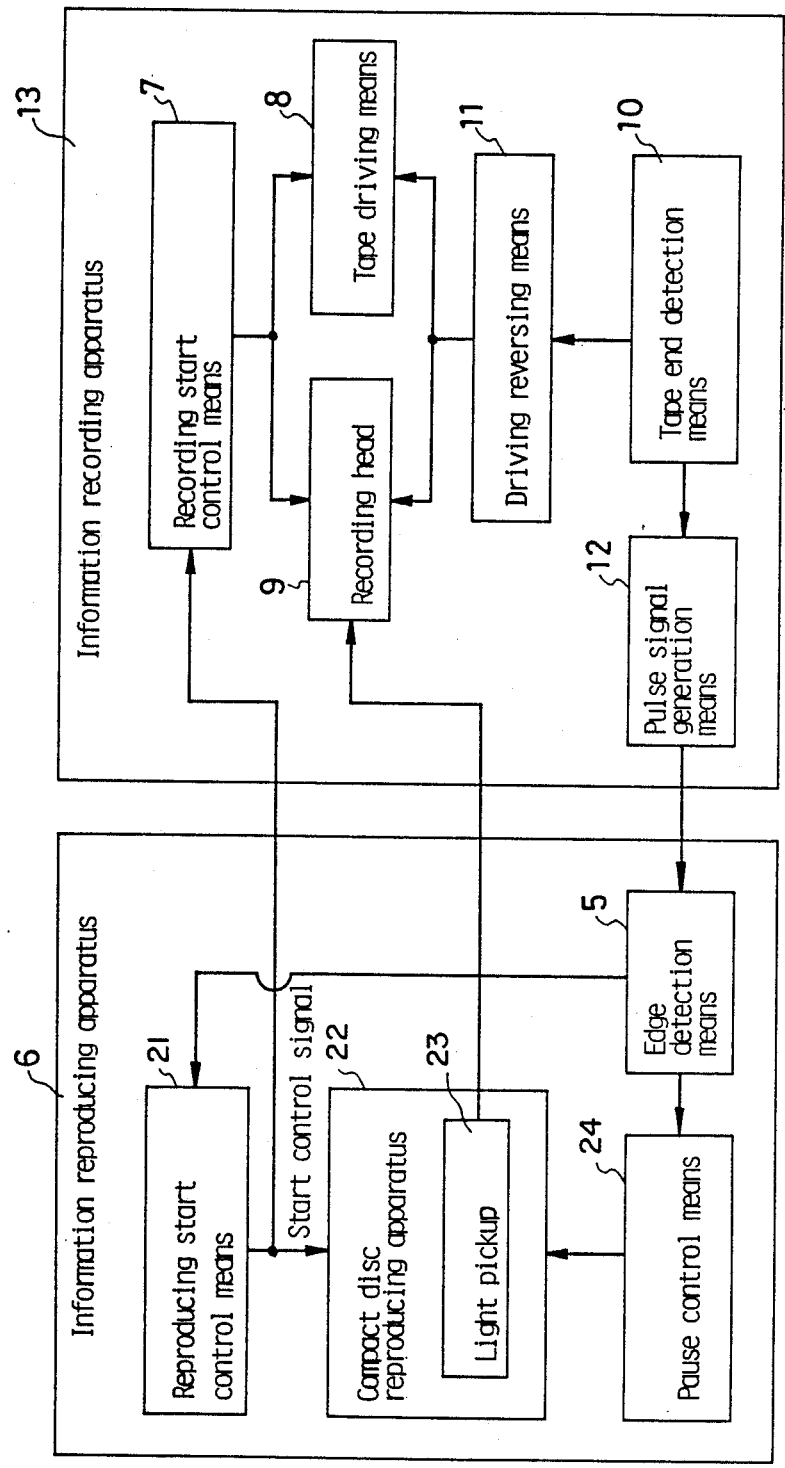
FIG. 1 is a circuit block diagram of a preferred embodiment of the information reproducing and recording apparatus in accordance with a present invention.

A preferred embodiment of the present invention is described with reference to FIG. 1, FIG. 2 and FIG. 3. As shown in FIG. 1, an information reproducing apparatus 6 comprises a compact disc reproducing apparatus 22 having a light pickup 23. The information reproducing apparatus 6 also contains edge detection means 5 for detecting edges of an input pulse thereto and outputting timing signals to the reproducing start control means 21 and pause control means 24. The reproducing start control means 21 outputs control signals to the compact disc reproducing apparatus 22 and recording start control means 7 in the information recording apparatus 13, to synchronize the reproduction and recording functions and to start the information recording apparatus 13 prior to the start of the information reproducing apparatus 6. The pause control means 24 outputs a signal pausing the operation of the compact disc reproducing apparatus 22. The information recording apparatus 13 also comprises a recording head 9 and a tape driving means 8. When a start control signal, from the reproducing start control means 21, is input to the recording start control means 7, the control means 7 signals the recording head 9 and the tape driving means 8 to reverse their driving direction. The information recording apparatus 13 further comprises tape end detection means 10 which issues a tape end signal at detection of the tape end to driving reversing means 11, which reverses the driving direction of the tape driving means 8 and the recording head 9. The tape end detection means 10 further issues a signal to a pulse signal generation means 12, which after a predetermined time period, issues a pulse signal to the edge detection means 5 in the information reproducing apparatus 6. Tape end detection means 12 is, for instance, a reflection type photocoupler or the like sensor means.

Figure 2:
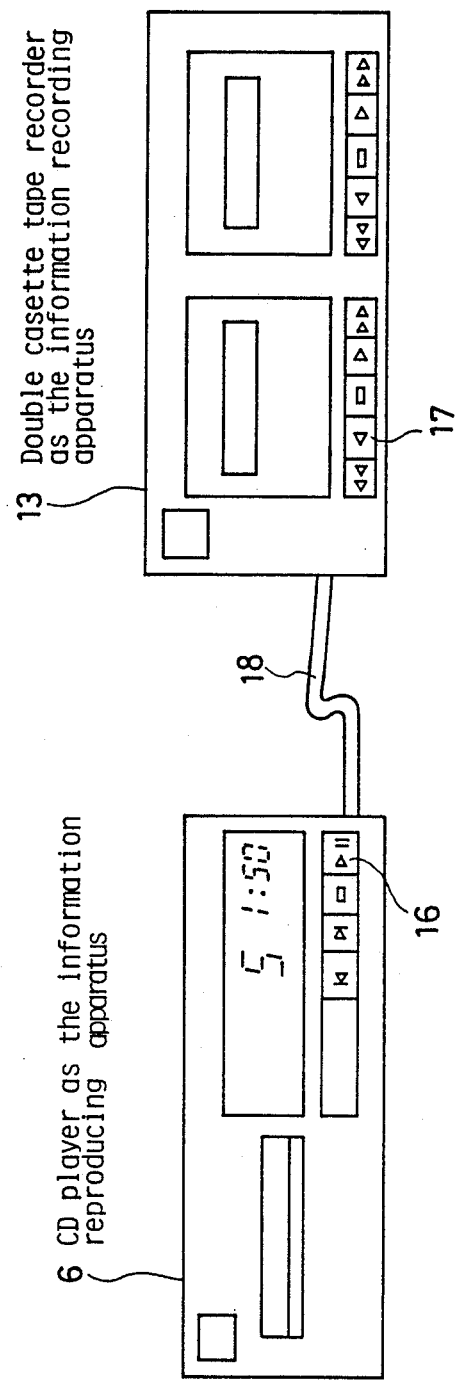
FIG. 2 is a front view showing a compact disc palyer as the information reproducing apparatus and a double cassette tape recorder as the information recording apparatus.
Figure 3:
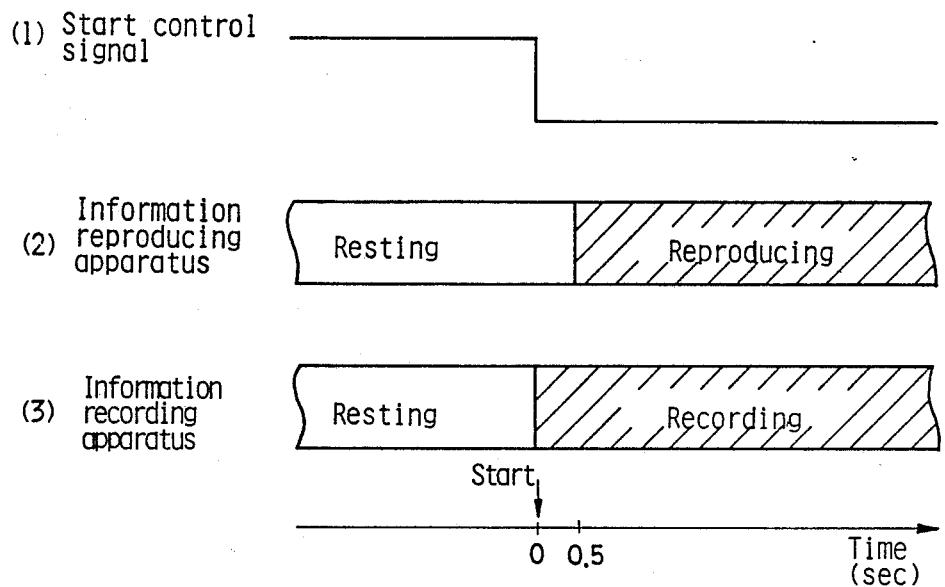
FIG. 3 and FIG. 4 are timing charts showing the operations of the information reproducing and recording apparatus embodying the present invention.
Figure 4:
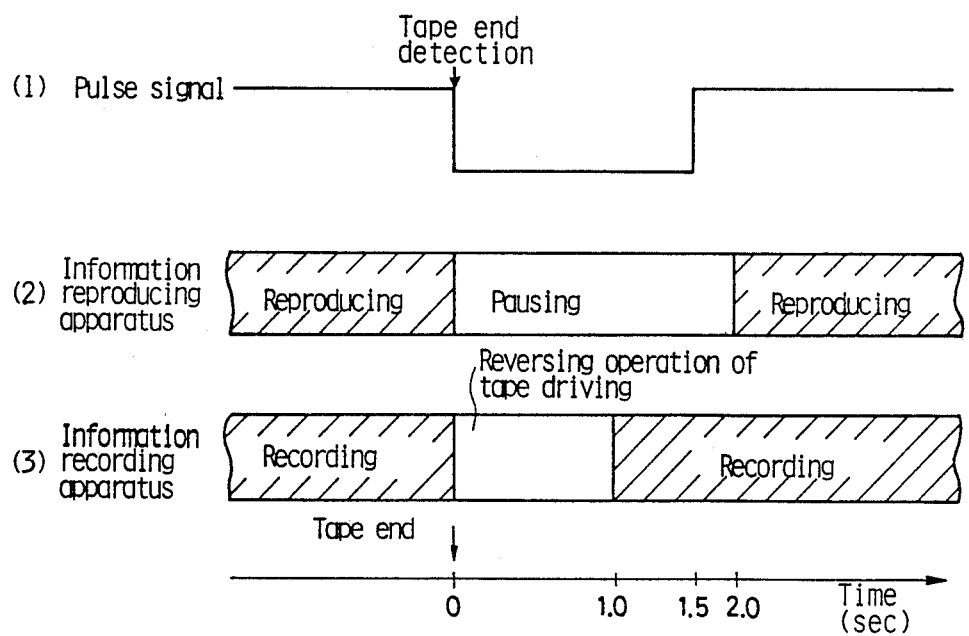
Figure 5:
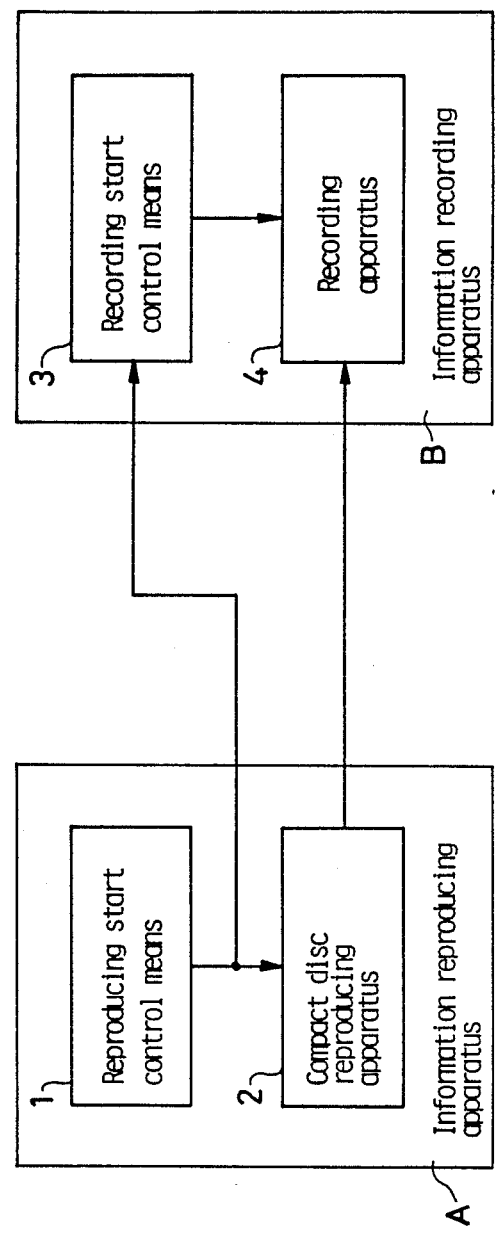
FIG. 5, consisting of A and B, is the information reproducing and recording apparatus of the prior art.

FIG. 2 is a front view showing front panels of the information reproducing apparatus 6 which is a CD player and the information recording apparatus 13 which is an auotmatic reversing cassette tape recorder. The information reproducing apparatus 6 has a function key 16 which can serve as a key for the reproducing start control means 21 and also as the pause control means 24. That is, when the information reproducing apparatus 6 is not yet started for the information reproducing, the apparatus is started by pushing the key 16, by a function of a known relay switch (not shown), thus functioning as the reproducing start control means 21. When the information reproducing apparatus 6 is in a reproducing state, a push of the key 16 enables the functioning of the pause control means 24. Further, a key 17 on the information recording apparatus 13 enables the functioning of the recording start control means 7. The cable 18 contains connections from the reproducing start control means 21 to the recording start control means 7, from the light pickup 23 to the recording head 9 and from the pulse signal generation means 12 to the edge detection means 5.

The operation of the above-mentioned embodiment is as follows: First a compact disc or an optical disc having suitable information thereon is installed in the compact disc reproducing apparatus 22, and a cassette tape is installed in the information recording apparatus 13. Then, by pushing the key 16, a start control signal is issued from the reproducing start control means 21 to the compact disc reproducing apparatus 22. Then, the compact disc reproducing apparatus 22 starts reproducing the information stored on the compact disc by the light pickup 23, after 0.4–0.5 sec. from the reception of the start control signal. Simultaneously with the reception of the start control signal by the compact disc reproducing apparatus 22, the start control signal is given to the recording start control means 7. The recording start control means 7 starts the head 9 and the tape driving means 8. Thus, the starting time of the recording on the cassette tape, in the information recording apparatus is set 0.4–0.5 sec. prior to the start of information leading by the light pickup 23. Accordingly, the information which is picked up by the light pickup 23 from the optical disc is recorded to the cassette tape without fear of omitting its starting part, as a result of the above-mentioned 0.4–0.5 sec. delaying of the start of the compact disc reproducing apparatus.

When the cassette tape comes to one end, the tape end detection means 10 detects the end of the cassette tape, and issues the end detection signal to the driving reversing means 11. At reception of the tape end detection signal from the tape end detection means 10, the pulse signal generation means 12 issues a falling edge pulse to the edge detection means 5. The edge detection means 5 issues a signal to the pause control means 24, which makes the compact disc reproducing apparatus 22 pause for a predetermined time period. At that time, the light pickup 23 may be stopped at that position or may go back by a predetermined number of tracks and stopped. The information reproducing apparatus 6 thus pauses the information reproducing operation when the cassette tape of the information recording apparatus comes to the end.

On the other hand, the driving reversing means 11 which receives the end detection signal from the tape end detection means 10 makes the tape driving means 8 and the recording head 9 reverse the driving direction to the opposite one, or to another track or another cassette tape. Since the time period necessary for reversing the state of head 9 and the direction of running of the tape by the tape driving means 8 is several hundred milli to one thousand milli seconds, the pulse signal generation means 12 is designed to issue a rising edge pulse signal to the edge detection means 5 after about 1.5 seconds from the reception of the end detection signal from the tape end detection means 10. Upon reception of the rising pulse signal from the pulse signal generation means 12, the edge detection means 5 issues a restart signal which enables the reproducing start control means 21, to input a start signal to the compact disc reproducing apparatus 22 to resume reproducing. Then, the compact disc reproducing apparatus 22 turns to the reproducing state after 1.5 second from the generation of the rising pulse signal. Though the start control signal, which is issued from the start control means 21, is also given to the recording start control means 7, the information recording apparatus 13, which is already in the recording state, neglects the start control signal and continues the recording state.

After reversing (or shifting) the recording state of the information recording apparatus 13 by reversing (or shifting) the position (or track) of the recording head 9 and the direction of the tape driving means 8 in the reversed (or shifted) running state, the recording of the information on the compact disc in the information reproducing apparatus 6 to the cassette tape in the information recording apparatus 13 is restored and carried out.

As has been described above, since the compact disc reproducing apparatus 22 reproduces only during the recording operation of the information recording apparatus 13, the information recorded on the cassette tape is not omitted even at the location where the tape driving of the information recording apparatus 13 was reversed. Therefore, a complete recording of the information from the compact disc to the cassette tape is accomplished by detecting the tape end and subsequently pausing the information reproducing apparatus 6 for a predetermined time, which is longer than the time period necessary for reversing the driving direction of the cassette tape.

Although the invention has been described in its preferred form with a certain degree of particularity, it is understood that the present disclosure of the preferred form has been changed in the details of construction and the combination and arrangment of parts may be resorted to without departing from the spirit and the scope of the invention as hereinafter claimed.

What is claimed is:

1. An information reproducing and recording apparatus comprising:
  a disc reproducing apparatus for reproducing information recorded on a disc,
  a recording apparatus for recording the information reproduced from said disc on a recording medium having at least two running directions,
  recording start control means for controlling the start of said disc reproducing apparatus a predetermined time after the start of the recording apparatus,
  end detection means for detecting the end of said recording medium,
  reversing means for reversing the running direction of the recording medium in the recording apparatus,
  pause control means for pausing said reproducing information from said disc reproducing apparatus when the end detection means detects the end of the recording medium until the reversing means reverses the running direction of the recording medium.

2. An information reproducing and recording apparatus comprising:
  a compact disc player for reproducing information recorded on a compact disc,
  a reverse operation tape recorder for recording information reproduced from said compact disc player on a recording tape having at least two running directions,
  recording start control means for controlling the start of said compact disc player, synchronously with the start of the reversible operation tape recorder,
  end detection means for the detecting the end of the recording tape,
  reversing means for reversing the running direction of the recording tape in said tape recorder, p1 pause control means for pausing said reproducing of information from said compact disc player for a predetermined pause time period when the end detection means detects the end of the recording tape.

* * * * *